(12) United States Patent
Johnson et al.

(10) Patent No.: US 6,820,225 B1
(45) Date of Patent: Nov. 16, 2004

(54) NETWORK TEST INSTRUMENT

(75) Inventors: Craig V. Johnson, Colorado Springs, CO (US); Paul S. Swanson, Monument, CO (US)

(73) Assignee: Fluke Corporation, Everett, WA (US)

( * ) Notice: Subject to any disclaimer, the term of this patent is extended or adjusted under 35 U.S.C. 154(b) by 535 days.

(21) Appl. No.: 09/676,632

(22) Filed: Sep. 30, 2000

(51) Int. Cl.[7] .............................................. G01R 31/28
(52) U.S. Cl. ................................. 714/715; 324/76.11
(58) Field of Search ............................. 324/73.1, 500, 324/76.12, 512, 600, 523, 520, 521, 533; 714/43, 715

(56) References Cited

U.S. PATENT DOCUMENTS

| | | | |
|---|---|---|---|
| 3,718,813 A | | 2/1973 | Williams, Jr. et al. |
| 4,468,705 A | * | 8/1984 | Burton ........................ 358/447 |
| 4,581,577 A | * | 4/1986 | Nowosad et al. ............. 324/66 |
| 4,766,386 A | * | 8/1988 | Oliver et al. ................ 324/533 |
| 4,970,466 A | * | 11/1990 | Bolles et al. ................ 324/533 |
| 5,128,619 A | * | 7/1992 | Bjork et al. ................. 324/533 |
| 5,352,984 A | * | 10/1994 | Piesinger .................... 324/532 |
| 5,633,801 A | * | 5/1997 | Bottman ....................... 702/65 |
| 5,805,150 A | * | 9/1998 | Nishino et al. ............. 345/213 |
| 5,946,301 A | * | 8/1999 | Swanson et al. ............ 370/252 |
| 5,966,427 A | | 10/1999 | Shaffer et al. ................. 379/1 |

FOREIGN PATENT DOCUMENTS

| | | |
|---|---|---|
| EP | 0501722 | 9/1992 |
| EP | 0721100 | 7/1996 |
| EP | 0768537 | 4/1997 |
| GB | 2241790 | 9/1991 |

OTHER PUBLICATIONS

"Intelligent TDRs Score High on T–1 Tests", D.P. Haas, Sep. 16, 1991, Telephony (USA), vol. 221, No. 12, pp 18–20, 23–24.*

"A Personal Network Analyser Built With Only 15 ICs", Steve Hagemen, Jan. 1998, QST Magazine, www.arrl.org/qst/.*

* cited by examiner

Primary Examiner—Albert Decady
Assistant Examiner—John Trimmings
(74) Attorney, Agent, or Firm—Dellett & Walters

(57) ABSTRACT

A network test instrument employs at least 2 PN sequences that are applied to a network for testing. The instrument further characterizes very short cables, impedance measurement.

9 Claims, 10 Drawing Sheets

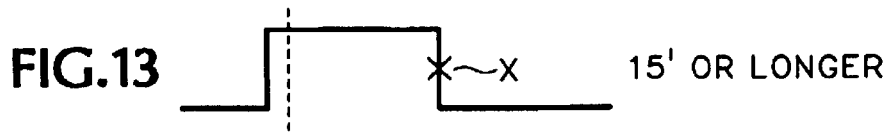
FIG.13 — 15' OR LONGER
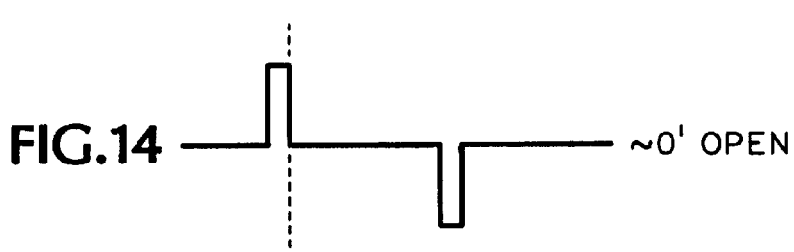
FIG.14 — ~0' OPEN
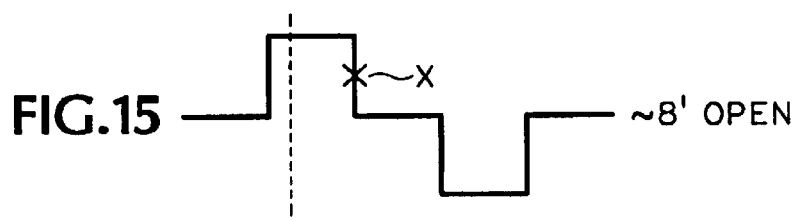
FIG.15 — ~8' OPEN
FIG.16 — SPLIT-PAIR @ ~8 (~150Ω)
FIG.17 — BRIDGE TAP @ ~8 (~50Ω)
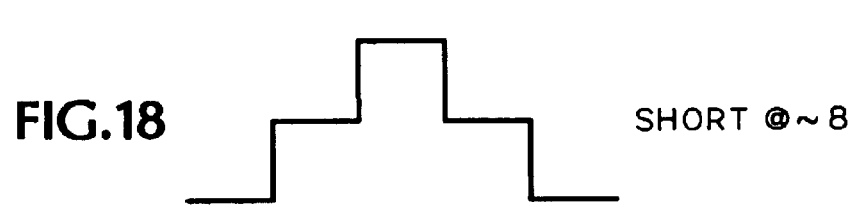
FIG.18 — SHORT @ ~8
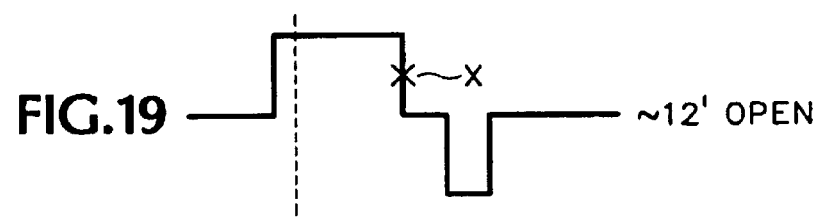
FIG.19 — ~12' OPEN

NETWORK TEST INSTRUMENT

BACKGROUND OF THE INVENTION

This invention relates to test instruments for testing of networks, such as LANs (local area networks).

In testing networks, such as LANs, for example, cable faults and the like are desirably detected, since the chance for cable mis-configuration or damage (opens, shorts, split pairs, etc) is always present, and can undesirably impact network performance. In order to test for various conditions, it is necessary to provide some stimulus onto the network or cable, in order to measure the response of the cable or the network. However, the stimulus can often negatively affect network performance, causing data errors or other problems to users of the network.

In network operations, often a question arises regarding the configuration or reliability of a network patch cable. However, existing network test instruments are not adapted to test patch cables of less than 20 feet length. Therefore, the user is left to wonder whether it is a patch cable causing problems. Or, the cable is replaced with an assumed good cable, which can result in waste from throwing away suspected cables when the cable is not the cause of a particular problem. The office environment can be very difficult for cables, as they are often mashed or otherwise abused, which can cause network performance loss. However, the cable may appear otherwise normal to visual inspection.

Finding a particular network cable of interest for testing or inspection can be difficult, especially when a network wiring closet has many cables therein, each having substantially the same size and jacket color.

SUMMARY OF THE INVENTION

In accordance with the invention, pseudo-random-number sequences are applied to the network, and the network response is characterized, to determine length, faults, impedance and the like.

Accordingly, it is an object of the present invention to provide an improved apparatus and method for testing networks.

It is a further object of the present invention to provide an improved apparatus and method for determining characteristic impedance of network cables.

It is yet another object of the present invention to provide an improved network test instrument adapted to test short cables.

Another object of the invention is to provide an improved method and apparatus for testing active networks without disturbing network traffic.

A further object of the invention is to provide an improved test instrument that can automatically detect the presence of a cable connection thereto, and begin measurements automatically.

Another object of the invention is to provide an improved network test instrument adapted to drive audio signals over a network.

A further object of the invention is to provide an improved network test apparatus for detecting and classifying Ethernet link pulses.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 13 is a waveform representation of a response to a 100 ohm reference or a long, ideal 100 ohm cable;

FIG. 14 is a waveform representation of a response of a very short or zero length cable;

FIG. 15 is a waveform representation of a response of a cable having an open;

FIG. 16 is a waveform representation of a response of a split pair cable;

FIG. 17 is a waveform representation of a response of a cable having a bridge tap;

FIG. 18 is a waveform representation of a response of a cable having a short at 8 feet out from the test instrument;

FIG. 19 is a waveform representative of a response waveform on a cable with an open at 12 feet out;

FIG. 20 is a block diagram of an audio driving and detection system according to the instrument of the present invention; and.

DETAILED DESCRIPTION

The system according to a preferred embodiment of the present invention comprises a network test instrument that employs pseudo-random-number (PN) sequence stimulus to determine network response.

Figure 1:
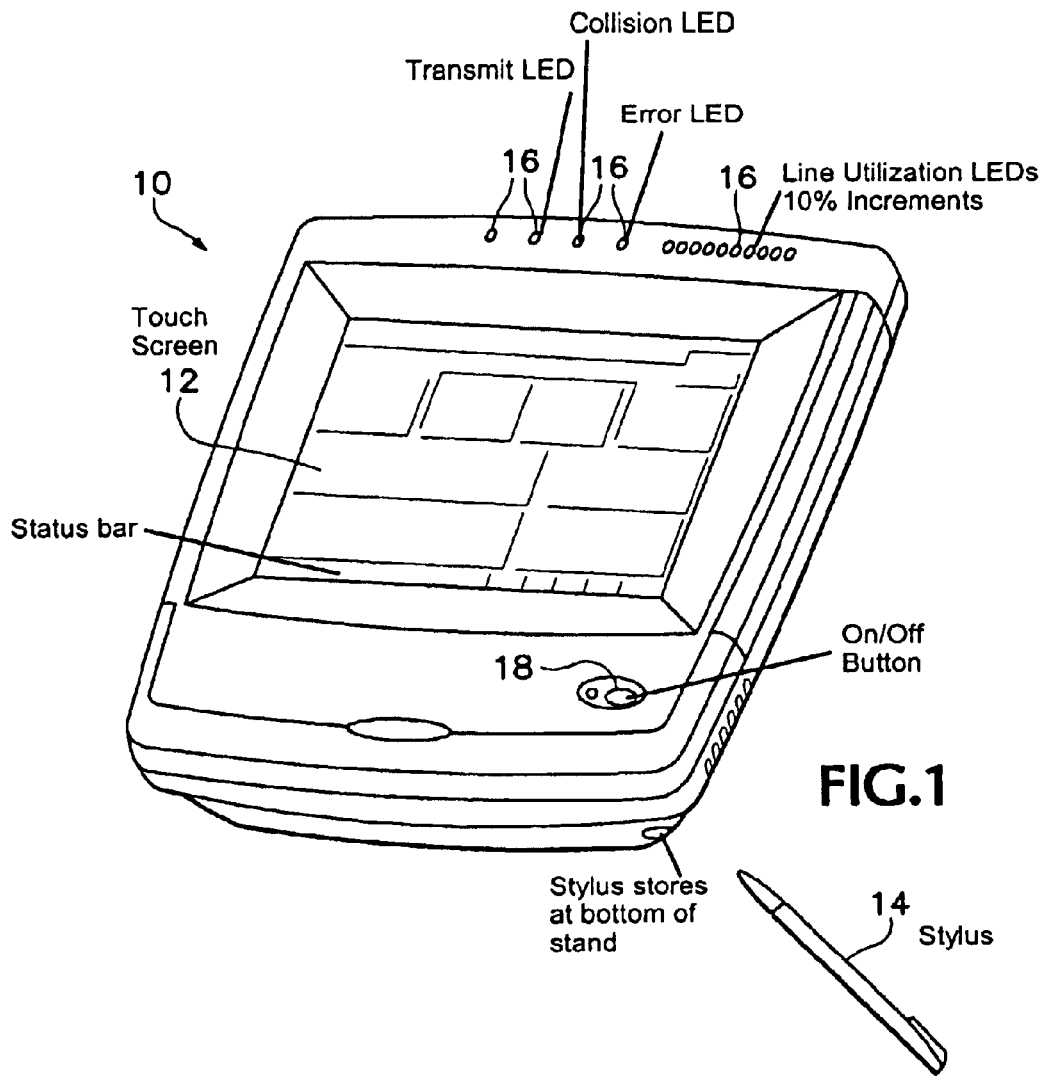
FIG. 1 is a perspective view of a test instrument embodying the invention.

Referring to FIG. 1, a perspective view of a representative network test instrument according to the invention, the instrument 10 suitably is configured as a portable or hand held instrument for network testing and analysis. A display region 12 enables user interaction with the instrument, the display suitably being a touch screen type display. A stylus 14 is employable by a user to interact with the device, by writing or tapping the screen to enter and select data. Various status indicators 16 are provided along the top of the case, to indicate link status, transmit, collision, error, percentage utilization and the like. A power button 18 is provided, also. The device is suitably powered by an internal battery system and may also be connected to an external power source.

Figure 2:
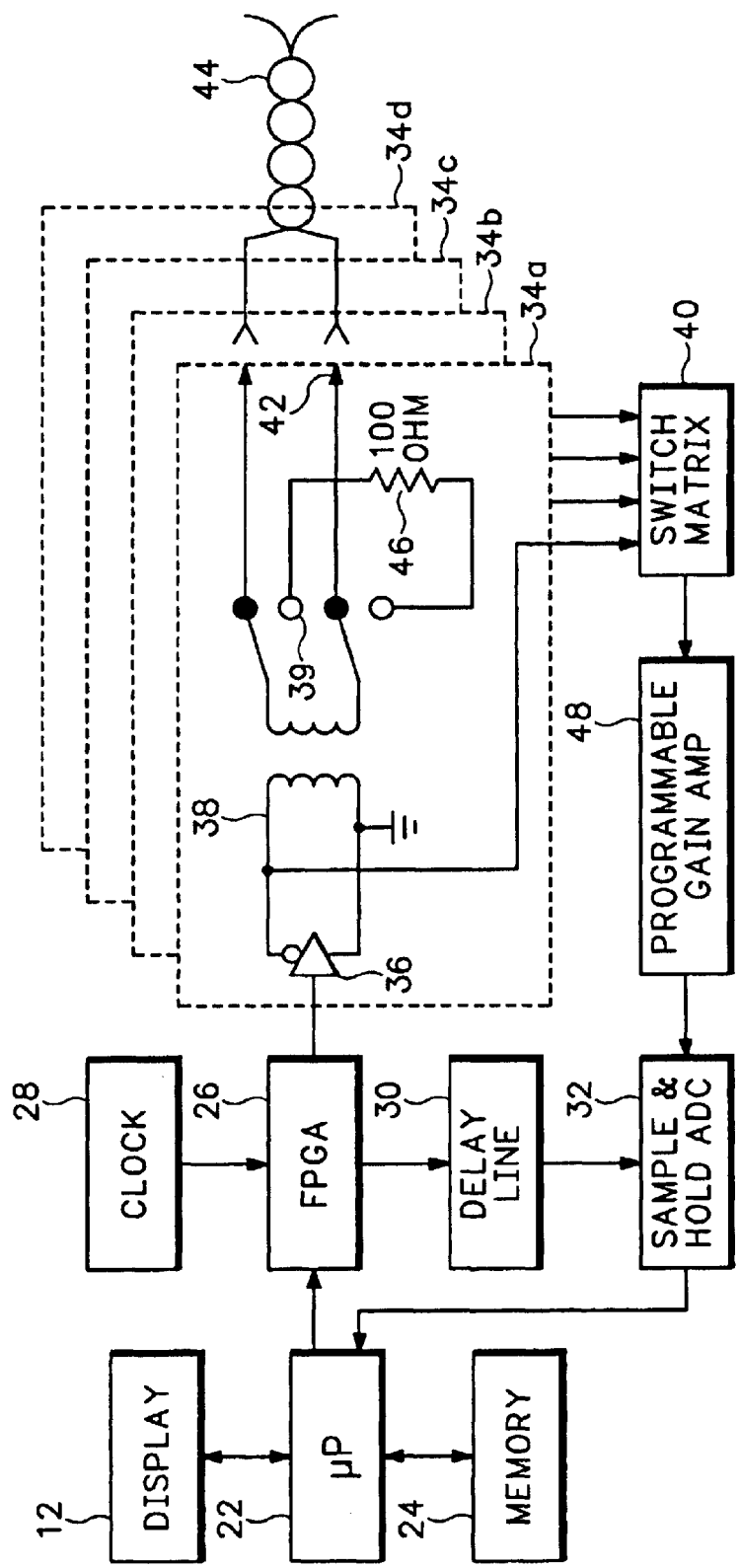
FIG. 2 is a block diagram of the instrument of FIG. 1.

FIG. 2 is a block diagram of the operational systems of the test instrument. A microprocessor 22 is employed with memory 24 to govern the overall operation of the device. Display 12 is interfaced with the microprocessor, for example, to control the display and data entry therefrom. A field programmable gate array (FPGA) 26 is in communication with the microprocessor and employs a clock 28, suitably a 50 MHz crystal controlled clock, in a particular embodiment. The FPGA provides input to a delay line 30, an output from the delay line comprising a first input to a sample and hold analog to digital converter 32. The FPGA further provides input to a channel interface 34, there being 4 such interfaces 34*a*, 34*b*, 34*c* and 34*d* in the particular embodiment. Each channel in the illustrated embodiment represents an Ethernet twisted pair under standard TSB-67 wiring for twisted pair Ethernet.

Interface 34*a* is illustrated in detail, in FIG. 2, and comprises a driver 36 that connects to output transformer 38. One end of the primary of transformer 38 is grounded, while the other end connects as an input to a switch matrix 40. The secondary of transformer 38 is switched via switch 39 to either connect to the physical network interface connector 42, (which receives connection from twisted pair 44), or to a reference impedance 46, which comprises a 100 ohm precision resistor in the preferred embodiment. This reference impedance is also referred to as the "zero-length reference", since it provides reference measurements of a zero length connection to the device. Operation of the switch is governed by the FPGA or the microprocessor as discussed hereinbelow. Interfaces 34*b*, 34*c* and 34*d* correspond to interface 34*a*, providing respective inputs to the switch matrix 40 and connecting to respective twisted pairs of the cable 44. The switch matrix 40 provides input to a programmable gain amplifier 48, the output of the amplifier comprising an input to sample and hold analog to digital converter 32.

In operation, the system provides stimulus via the FPGA to the interface 34, and receives response signals through the switch matrix and amplifier to be sampled by the sample and hold analog to digital converter. Multiple applications of the PN sequence are made, time delayed, and the reflected information is combined. Noise and the like "falls out" from the combination, and the resulting data provides reflection anomalies that can be analyzed to determine cable length, faults and the like.

Figure 3:
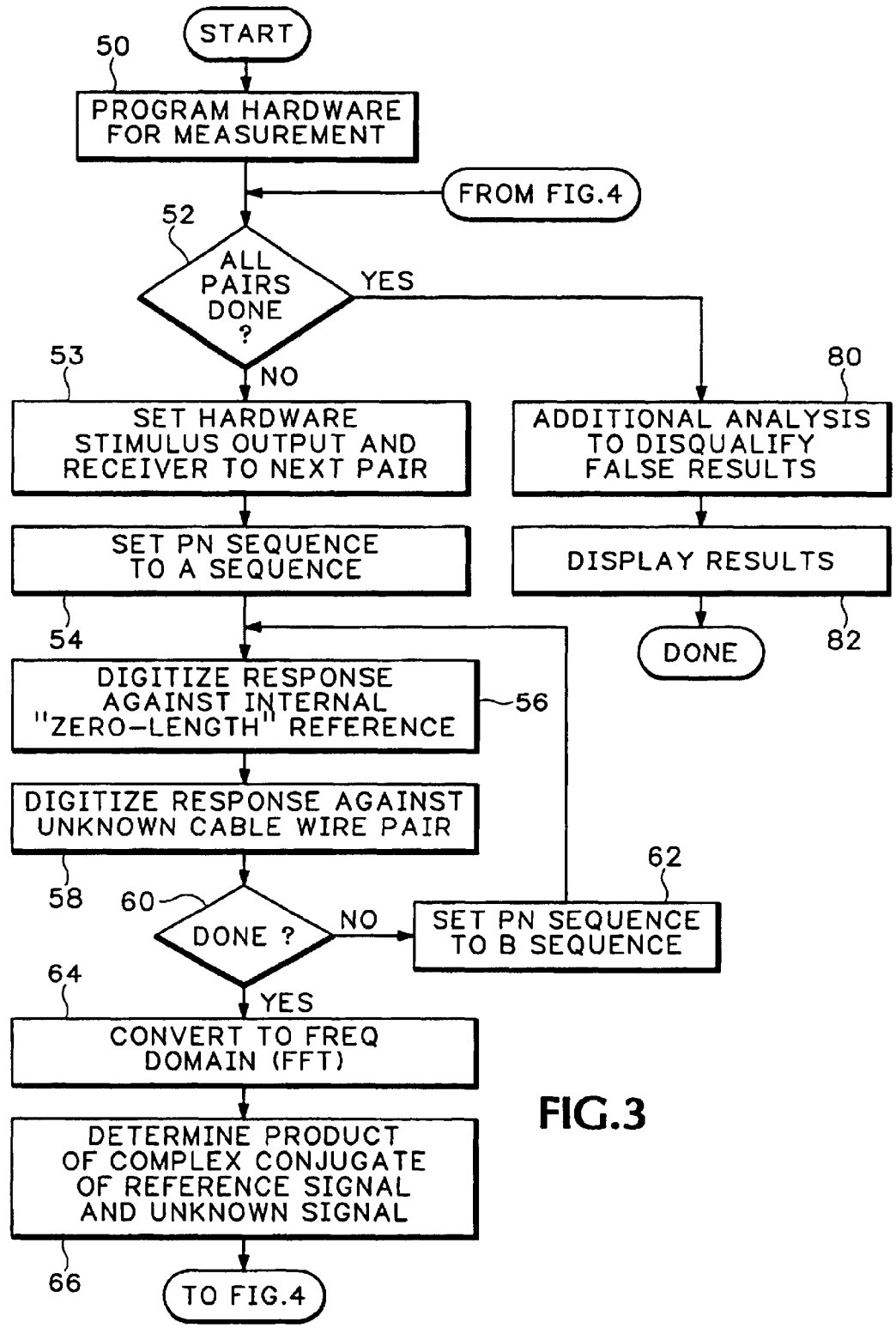
FIG. 3 is a flowchart of steps performed in analysis of a twisted pair cable according to the invention.
Figure 4:
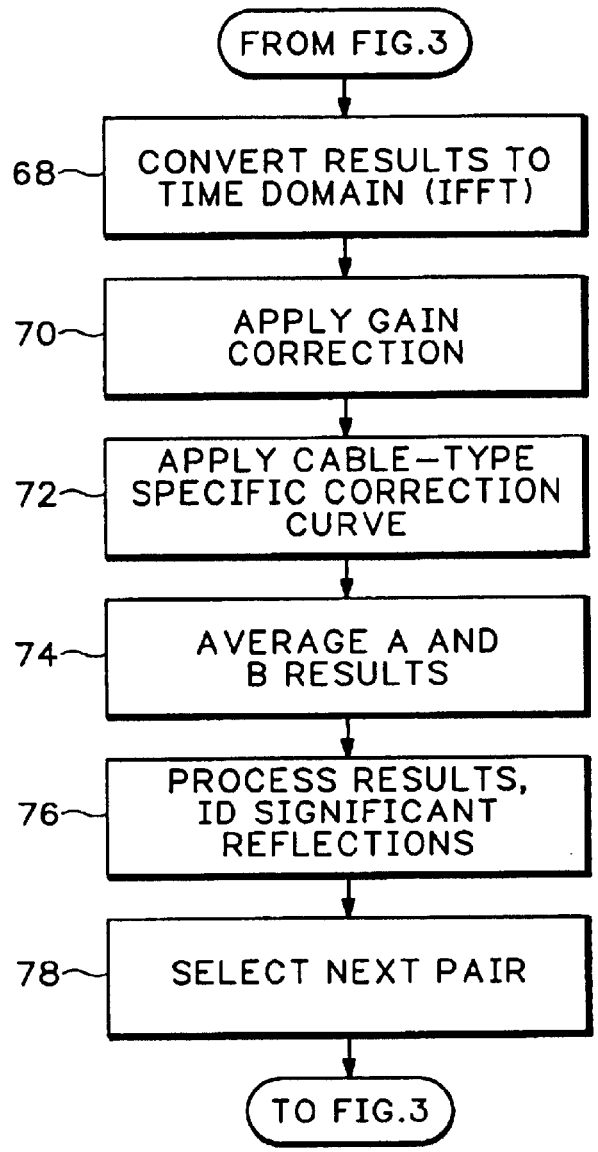
FIG. 4 is a continued flowchart of steps performed in analysis of a twisted pair cable according to the invention.

Referring to FIG. 3 and FIG. 4, which comprise a flow chart of operational steps in employing the instrument to make certain measurements, initially in block 50, the system hardware is programmed for the particular measurement to be performed. This programming entails the type of stimulus, timing, amplitudes, etc. Then, decision block 52 determines whether all wire pairs on a cable have been tested. The particular embodiment illustrated herein is shown in an environment of testing an Ethernet twisted pair cable, having 4 wire pairs. If all wire pairs have been tested, then the testing process is done. However, if not, then in step 53, the hardware stimulus output and receiver are set to the next pair to be tested, and in step 54, a PN sequence that is to be used in the measurements is set to a first sequence, the A sequence. Then, the PN sequence is applied to a "zero-length" reference and the response is digitized (block 56). With reference to FIG. 2, the zero-length reference comprises the impedance 46. Switch 39 is set to connect the secondary of transformer 38 to the impedance, and the PN sequence is applied from the FPGA to the driver 36, resulting in the stimulus going through the reference impedance. The switch matrix 40 selects the output of the particular wire pair being tested and supplies the response to the PN stimulus to the programmable gain amplifier 48. The output of the amplifier is sampled and digitized by the sample and hold analog to digital converter 32 and the digitized measurement is provided to the microprocessor 22. Next, in step 58, the response to the PN A sequence from the wire pair being measured is digitized, wherein switch 39 is set to connect to the external network interface connector 42, and the PN A sequence is again driven through transformer 38. This time, the response is again sampled, held and digitized, and stored. The timing of the sampling operations of the response waveforms may suitably be delayed from 0 to 510 whole clock cycles, by operation of a delay counter discussed hereinbelow. Also, fractional clock cycle sampling delays are accomplished, by delay line 30 providing an adjustable time delay to the sampling signal provided to the sample and hold. By performing equivalent-time sampling over multiple test iterations, and by adjusting the fractional clock delays of the sampling to sample over the range of sub-clock cycle time periods, a response waveform record is built up to provide a detailed response record.

Next, after step 58, a decision is made whether the application of the PN sequences is completed (decision block 60), or if not, then step 62 is performed, wherein the PN sequence is set to a second "B" sequence. The process then continues with block 56, wherein the response to the B PN sequence against the "zero-length" reference is digitized and the response to the PN sequence of the "unknown" cable wire pair is determined (step 58). Decision block 60 is again reached, and, if done, processing continues with block 64. While the illustrated example employs two PN sequences (A and B), this is not a limitation, as other numbers of sequences can be employed.

Continuing with step 64, the measurement results are converted to the frequency domain, suitably by application of a fast Fourier transform (FFT). Then the product is determined of the complex conjugate of the reference signal (the measurements into the impedance 46) and the unknown signal (the measurement via the cable connection) in step 66. This processing is done to compute the cross-correlation function of the reference and unknown responses. After step 66, processing continues with the steps of FIG. 4.

Referring to FIG. 4, step 68 is next performed, wherein the results of step 66 are converted to the time domain by an inverse fast Fourier transform (iFFT). The FFT and iFFT operations are advantageously performed on the microprocessor 22, which is preferably a digital signal processor (DSP), to provide an optimized method of determining the computation, which requires many sum-of-products operations. Next, a gain correction is applied in block 70 (a zero-length 100% reflection compensation) and a cable-type-specific correction curve may be applied in block 72 (100% reflection compensation over length). The results of the A and B PN sequence measurements are averaged (step 74). The data record (waveform) produced at this point is very nearly correspondent to that which would be acquired by more traditional time-domain-reflectometry (TDR) measurements. However, TDR measurements necessary to achieve the same results typically required more averaging, more gain, and/or greater stimulus, and would generally require a longer test time. In block 76, the results are processed and significant reflections are identified. Then the next wire pair to be tested is selected (block 78) and processing continues at decision block 52 of FIG. 3.

Referring again to FIG. 3, when the process continues from the steps of FIG. 4, if a determination at bock 52 is that not all pairs have been tested, then the steps continue as before, applying the PN A and B sequences to the reference and to the cable, to obtain measurement information. When the result of decision block 52 is that all the pairs to be tested have had the PN sequences applied and the responses recorded, then processing continues at step 80 of FIG. 3, wherein additional analysis is performed to disqualify false results, such as values which would be past the end of the cable pair, for example. The measured results are then sent to the user interface (e.g. display 12) for presentation to the user or other recordal (step 82). The process is then completed.

Other factors which assist in disqualifying false results or classifying responses are that certain passive responses typically are the same at different stimulus frequencies. However, responses from active devices will tend to move around with changes in clock frequency. Therefore, by varying the frequency of the applied PN sequence, different responses may be categorized as to type.

In a preferred embodiment, approximately 400 milliseconds of reference data is collected and 400 milliseconds of unknown wire pair data is collected, to complete the data acquisition associated with each wire pair.

Figure 5:
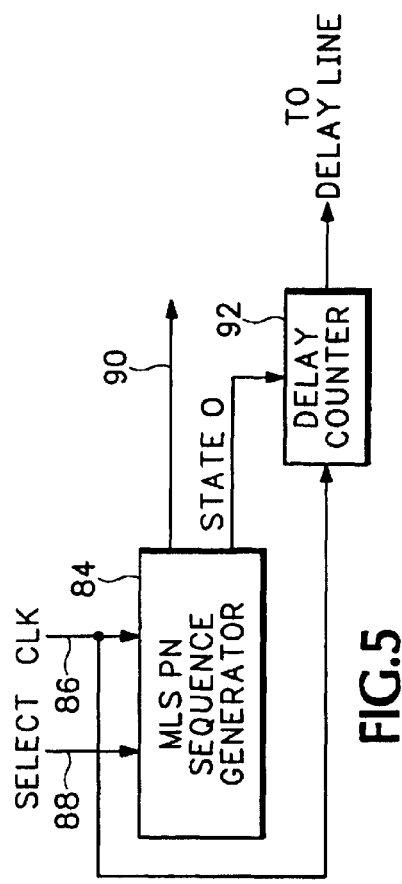
FIG. 5 is a high level block diagram of the PN sequence generation system according to the invention.

Referring to FIG. 5, a block diagram of the PN sequence generation system according to the invention, a maximum length sequence (MLS) PN sequence generator block 84 receives a clock signal 86 and a select signal 88. An output 90 provides the PN sequence. The clock signal 86 is also supplied to a delay counter 92 and the output of the delay counter is supplied to delay line 30 (FIG. 2). The delay counter also receives a zero state (STATE 0) output from the PN sequence generator. In operation, the PN sequence generator provides output on line 90 comprising the PN sequence that is applied to the driver 36 that drives transformer 38 in FIG. 2.

Figure 6:
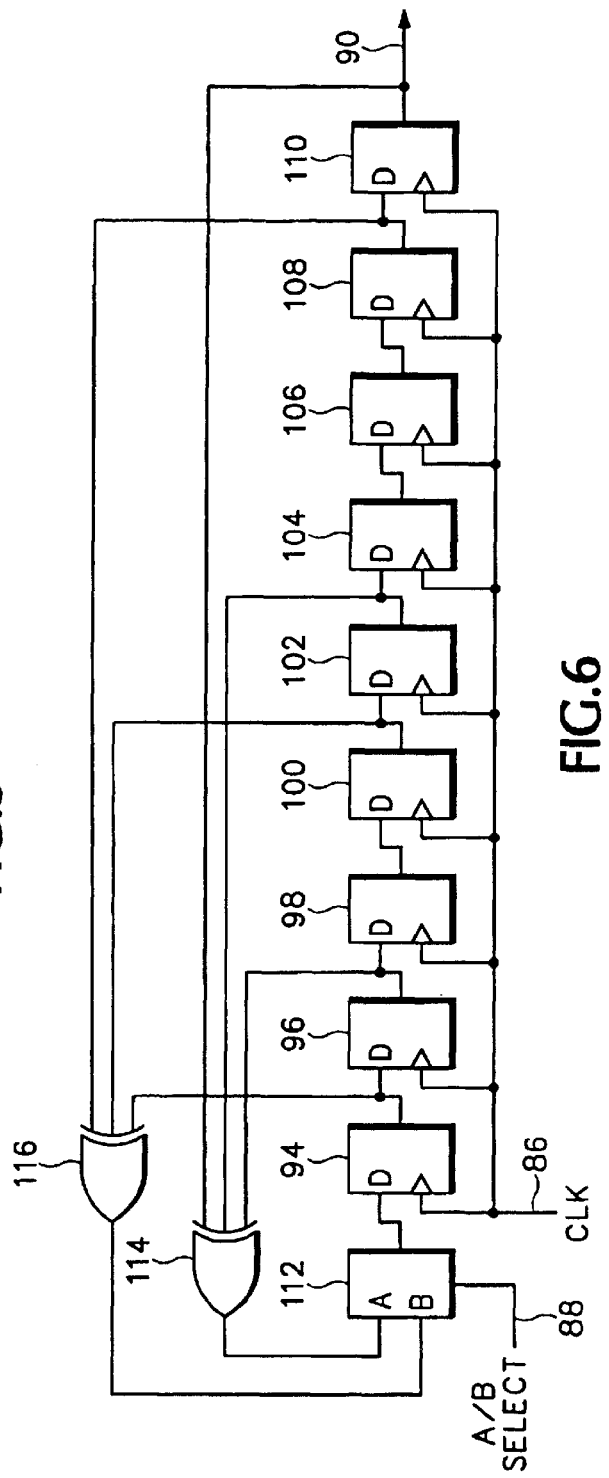
FIG. 6 is a more detailed diagram of the configuration of the PN sequence generation block of FIG. 5.

FIG. 6 is a more detailed view of part of the PN sequence generator 84. The PN generator comprises a 9 bit long shift register with multiple feed backs. The shift register is implemented via nine flip flops 94, 96, 98, 100, 102, 104, 106, 108, and 110, which are all clocked by the clock signal 86. The flip flops are arranged in serial fashion, with the output of one flip flop being supplied as the input of the next serial flip flop. The final flip flop 110 provides the output signal 90. A selection gate 112 supplies its output as the input to the first flip flop 94, and receives two inputs designated A and B. Each of the two inputs is derived from the output of a respective exclusive OR (XOR) gate 114, 116. The XOR gates receive three inputs, which are derived from selected outputs of ones of the flip flops. In the figure, XOR gate 114 receives its inputs from the output of flip flops 96, 102 and 110, while XOR gate 116 receives its inputs from the outputs of flip flops 94, 100 and 108.

In operation, by controlling the select line 88, which XOR gate output is fed back into the serial flip flops is determined. It may be understood, therefore, that by operation of the select line, a different PN sequence is generated, depending on the state of the select line. Therefore, two PN sequences A and B may be derived, in the illustrated embodiment. However, a plurality of PN sequences, more than two, may be suitably employed.

The state zero signal is active when the PN sequence generator is at the zero state, when all the flip flop outputs are, for example, all ones. The flip flop outputs may suitably be supplied to a nine input AND gate, for example, to determine when they are all ones. Therefore, in operation, when the PN sequence generator reaches the zero state, the delay counter is notified that the zero state is reached and may begin counting, to delay full clock cycles, from 0 to 510 in the illustrated embodiment, allowing delay covering the 511 possible states of the PN sequence used in the illustrated embodiment. The delay line provides intra-clock period delays, from 0 ns up to a one clock period delay. Therefore, the timing of the sample and hold amplifier and analog to digital converter 32 may be adjusted by delaying fractional clock cycles, to very fine resolution, providing 2.5 nanosecond resolution based on a 50 MHz clock, for example (clock 28 of FIG. 2). As repeated applications of the PN sequence are made, the delay counter and delay line vary the sample point along the reflected signal data, allowing fine time resolution of the returned signal data.

In the illustrated embodiment, a $2^n$-1 bit PN sequence is provided (the all zeros case is excluded). With n=9 (9 flip flops), the result is a 511 bit sequence. This value is selected based on an environment for measurements on 1000 foot maximum (approximate) cables. If longer cables are to be measured, a longer sequence is employed. Longer sequences, allow longer channel path analysis, but are more computationally intensive. Complementary PN codes, such as Golay codes, can be used as the PN sequences, since these codes are inherently immune to "noise", such as imbalances or artifacts in the measurement result that might be introduced by the choice of PN sequence data. Golay codes do not introduce such "noise" into the measurement data.

In accordance with the invention, certain cable problems and states can be measured. Such problems include, for example, split pairs (where two wires from a given twisted pair have been paired with other wires, rather that keeping the two together), bridge taps, broken wires, excessive length of a pair untwisted at an end (resulting in cross talk), and crushed cables (for example, crushed under a chair or table) which shows up as an impedance attenuation.

The signal applied to the network cable for performing the tests is suitably highly attenuated. For example, in the preferred embodiment, 150 mv peak to peak is the signal level employed. Therefore, the test signals are below the noise level that is typically allowed in the network environment (typically 250 to 300 millivolts). Therefore, the signal employed in the testing is below the noise threshold of most hubs or switches so testing can be performed on active hubs or switches without detrimental effects on the network.

It may be understood that variations from the preferred embodiment are available. For example, while two different PN sequences A and B are employed in the illustrated embodiment, more than two codes can be used for further accuracy. Also, more averaging would provide additional measurement precision. Further, while averaging is the preferred embodiment of the multiple PN sequence combining, the product of A and B may also be employed (the sign of the terms is tracked). Different polynomials may be employed (longer or different feed backs). Additionally, different implementations in hardware or software may be used to perform the cross-correlation operation.

Other measurements such as cross talk/TDX, power-sum NEXT, ACR (attenuation to cross talk), return loss, longitudinal conversion loss, ELFEXT, for example, may be accomplished with the device. Further, while the illustrated applications employ single ended measurements with one device at one end of a cable, devices can be placed at both ends of a cable, for active measuring from both ends. The resolution of the digitizer can be modified, also, for different measurements. Time domain cross talk measurements where a cross talk event is given a positional location on a cable can also be accomplished. The clock rate can be varied depending on measurements that are being performed. For example, a slower clock rate can be employed with long telecommunication cable measurements, while higher clock rate can be used to assist in distinguishing between closely spaced anomalies. The stimulus amplitude is low in the preferred embodiment, advantageously allowing measurements that are not detected by normal network equipment. However, a high amplitude stimulus is employable for obtaining very fast measurements, or for measuring extremely long cables, when the particular measurement situation dictates.

Figure 7:
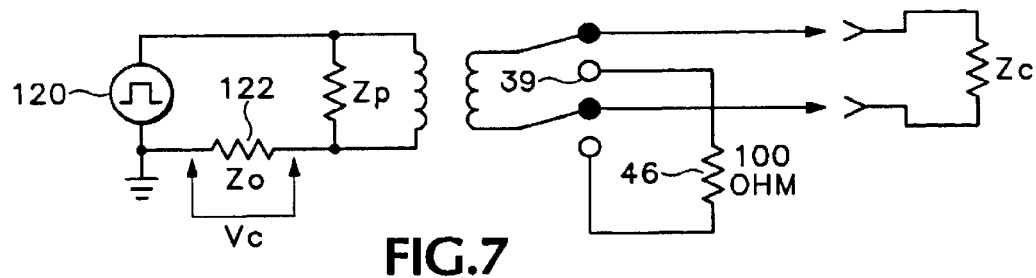
FIG. 7 is a schematic diagram of the interface employed with impedance measurement.

An additional application of the test instrument according to the invention is for characteristic impedance measurements on cables. Referring to FIG. 7, a schematic diagram of the interface employed with impedance measurement, for characteristic impedance measurement, the hardware configuration corresponds to that of FIG. 2. However, at the interface with the cable, certain modifications are made. A signal generator 120 applies a suitably square wave pulse to the transformer 38, through an impedance Zo. Zp is the equivalent parallel impedance provided by the circuit and voltage Vc is measured across the source output impedance 122. The impedance to be measured (suitably that of a cable, for example) is represented by Zc in FIG. 7. A switch 39 is provided to alternatively connect the output of the transformer 38 to a reference impedance 46.

In operation, a 2 clock cycle single pulse (having a stimulus level corresponding to that discussed hereinabove with reference to FIG. 2) is applied with switch 39 directed to the reference impedance, for calibration. The signal is applied and the sample and hold a to d converter captures the response. Then, switch 39 is moved to connect to the unknown wire pair Zc, and response measurements are taken. The impedance is determined as follows:

$$Vo=[Vc(Zo+(100||Zp))]/Zo \quad (1)$$

$$Zc||Zp=[Zo(Vo-Vc)]/Vc \quad (2)$$

Since Zo and Zp are known (suitably being 100 ohms and 700 ohms in a particular embodiment), Zc can be resolved.

In operation, a 50 ns pulse is applied and 1 ns spaced samples are taken. Ten points are selected to obtain an average impedance. Vc is measured against the reference impedance.

Employing equivalent time sampling, a number of samples at each point can be taken and averaged. For example, 8 samples can be taken at each point in time. Samples that are statistically significantly different from the other samples can be rejected. The system according to the invention therefore allows adaptive short cable measurements, is self calibrating, and has adaptive noise tolerance. Characteristic impedance measurements may be made in the presence of received signal traffic.

Short cables can be measured in accordance with the invention, providing some characterization of cables that would otherwise be too short for instruments in accordance with the prior art. To accomplish short cable measurements, two approaches are taken. First, provided the measured response is long enough to accommodate 10 sample points, the sample points are positioned earlier in the response record. If the response record is too short to provide the 10 sample points, fewer data points are employed. Therefore, while precision of the measurement may be less for extremely short cables, a measurement is still made, in contrast with prior art wherein short cables could not be measured. In accordance with the prior art, 15 to 25 feet was the minimum cable length that could be measured. In accordance with the present invention, cables of approximately 3 feet and less may be characterized for wiring problems and the like.

FIGS. 13–18 illustrate representative waveform reflections in response to the test pulse applied to a cable. FIG. 13 shows the ideal case, wherein either the reference impedance is connected (100 ohm in the illustrated embodiment) or an arbitrarily long cable with no faults. FIG. 14 represents the return data for a very short cable. FIG. 15 represents the return data for a cable having an open at 8 feet (or an unterminated 8 foot cable). The waveform of FIG. 16 is generated by a cable having a split pair, that is, where two wires from separate twisted pairs are mistakenly employed as a pair. FIG. 17 represents a bridge tap (where a connection of another cable pair to the cable is made intermediate along the cable). FIG. 18 illustrates the condition of a short in the cable at eight feet from the test instrument.

The instrument according to the invention is also adapted to test for the presence of a cable connected to the device. To perform the test, a 50 ns pulse is applied to the network interface connection of the device. Then, the return reflection data is analyzed to locate an amplitude at some time after time zero (after the pulse). The edge of the return data is located at a particular amplitude threshold, which denotes the presence of a cable. The amplitude threshold corresponds to impedance, wherein the greater the amplitude, the closer the impedance is to zero, and conversely, the lower the amplitude, the closer the impedance is to an infinite impedance (open). Alternatively, a time threshold can be used, that indicating that the reflected signal took more time to return than for the zero-reference, implying that a cable is present. FIG. 19 illustrates a representative waveforms for a twelve foot cable being attached to the device (or a cable with an open at 12 feet). The point denoted X in the drawings illustrates a representative edge at an amplitude threshold. In accordance with detection of the presence of a cable at the instrument, other measurements may begin automatically after a cable is detected as being connected. In a manner corresponding to the self-calibration noted above, the instrument suitably calibrates for the zero length case by employing the switch 39 and reference impedance 46.

Figure 8:
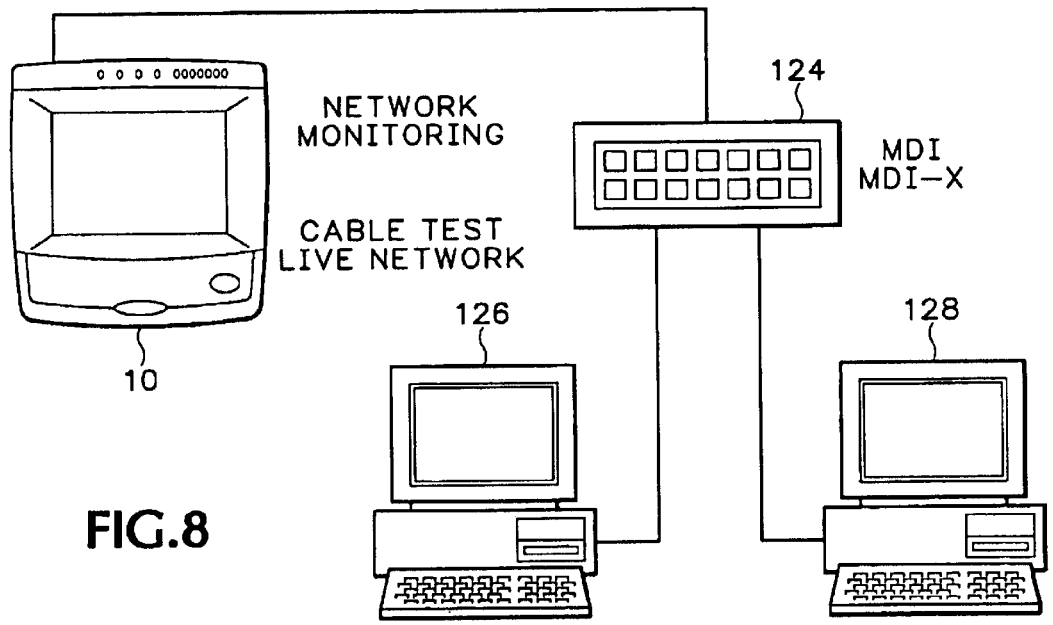
FIG. 8 is a diagram of a first measurement configuration employing the instrument.
Figure 9:
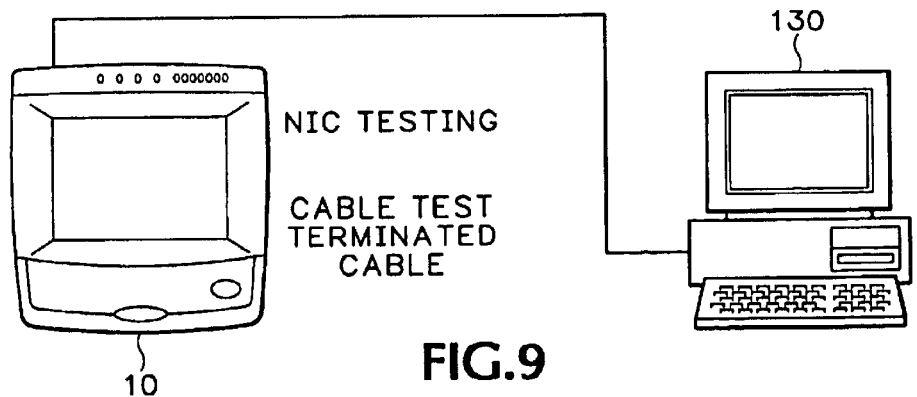
FIG. 9 is a diagram of a second measurement configuration employing the instrument.

As suggested hereinabove, the network test instrument according to the invention can be employed in various measurement configurations. FIGS. 8–12 illustrate representative placement of the test instrument. Referring to FIG. 8, the instrument 10 is connected to a network hub or switch 124 for monitoring of the network and for cable testing. Two hosts 126 and 128 are illustrated as connected to the hub/switch 124. In FIG. 9, the instrument 10 is connected via cable to the network interface of a PC 130 (or other network host) for testing the network interface card (NIC) in the PC. Also, since the cable connecting the instrument to the PC is terminated (by the NIC of the PC) cable testing on a terminated cable may also be performed in this configuration.

Figure 10:
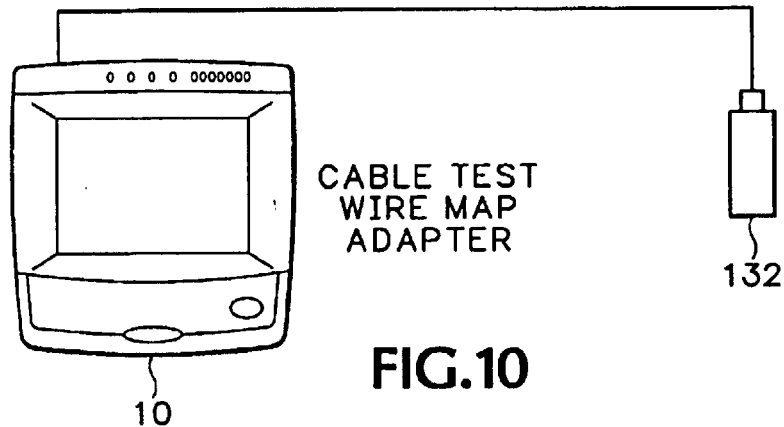
FIG. 10 is a diagram of a third measurement configuration employing the instrument.
Figure 11:
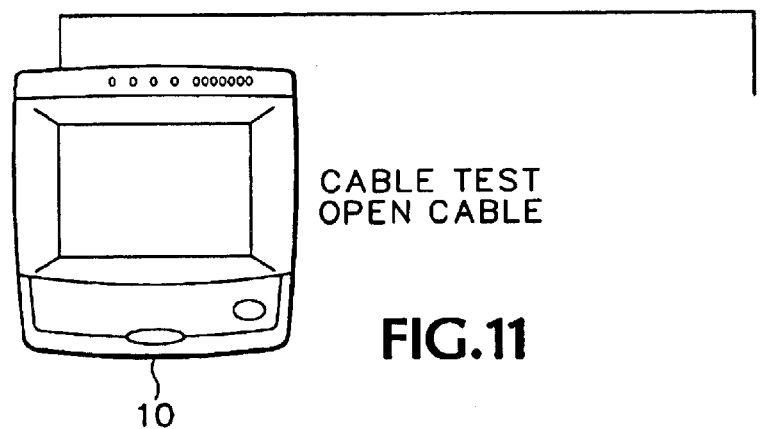
FIG. 11 is a diagram of a fourth measurement configuration employing the instrument.
Figure 12:
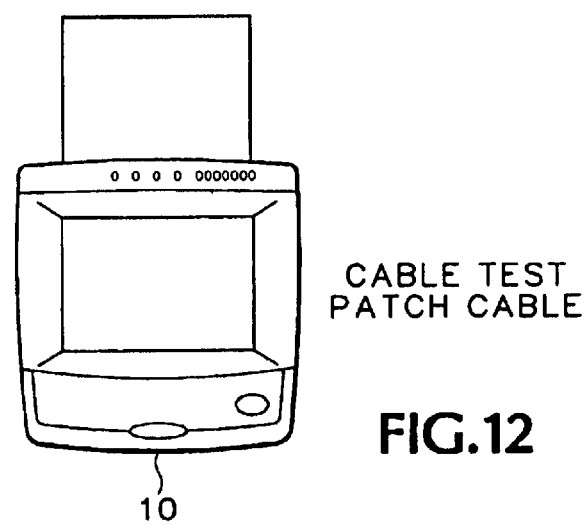
FIG. 12 is a diagram of a fifth measurement configuration employing the instrument.

FIG. 10 illustrates a configuration wherein the instrument 10 is connected via a cable to a wire map adapter 132. The adapter 132 includes various impedance terminations interconnecting the various cable wiring, so testing of the cable to determine the mapping of the wires can be accomplished. FIG. 11 illustrates the configuration of the instrument testing an open cable (unterminated) connected to the instrument, while FIG. 12 shows a testing configuration wherein a patch cable may be tested by connecting both ends of the cable to the instrument for characterization and analysis thereof.

Figure 20:
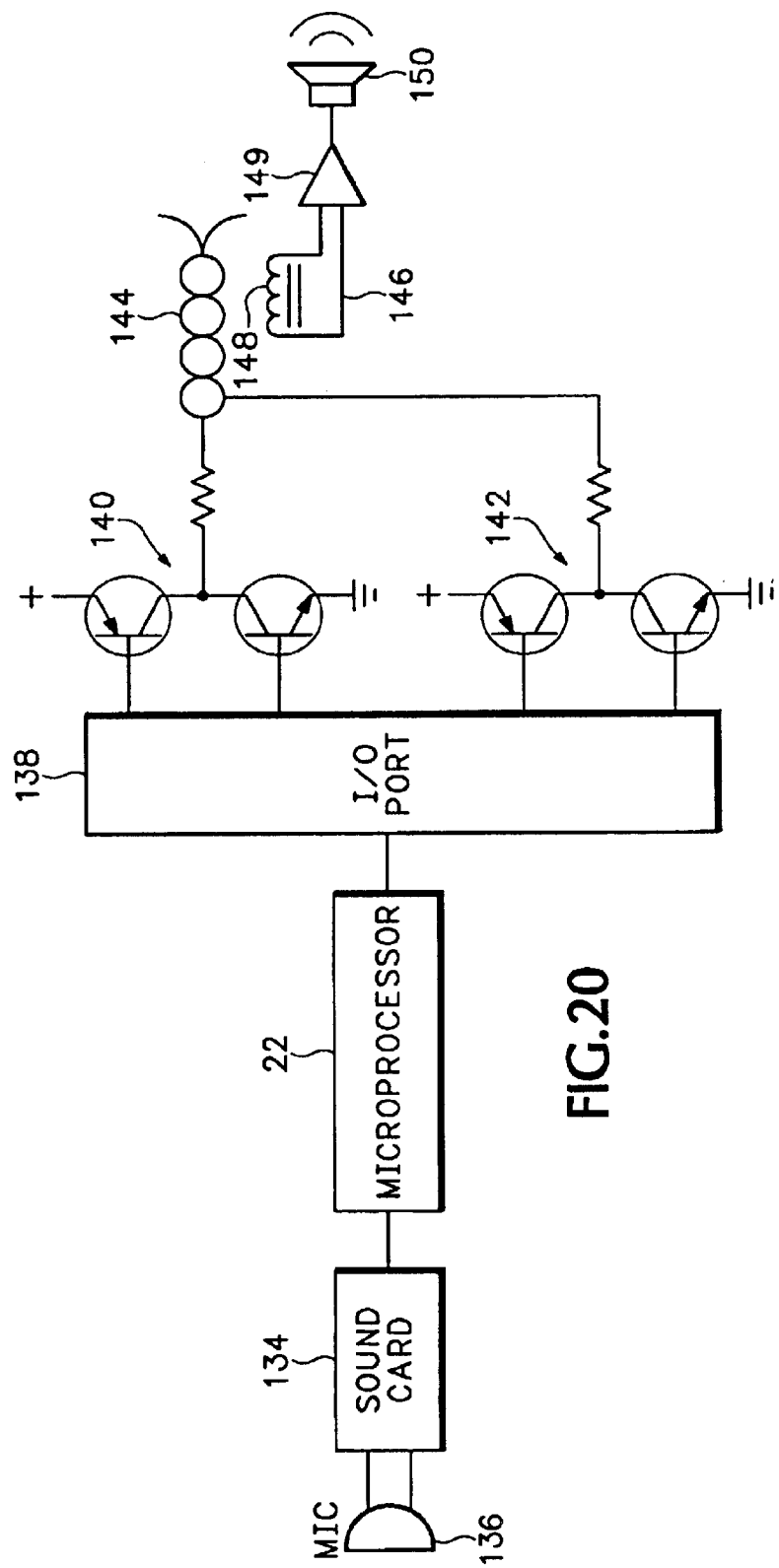

Referring now to FIG. 20, a block diagram of an audio driving and detection system according to the instrument of the present invention, it is possible to provide an audio signal over the network with the present invention. The microprocessor 22 receives input from a sound card 134 or other suitable source of audio data, which may be fed from a microphone 136 or other pre-stored audio information. An I/O port 138 receives data from the microprocessor, and drives first and second transistor pairs 140, 142. The collectors of the first pair of transistors are coupled to a first wire of a twisted pair, while the collectors of the second transistor pair are connected to the other wire of the twisted pair. A portable inductive audio receiver 146, including a pickup inductor 148, an amplifier 149, and a speaker 150 is suitably provided.

In operation, input from the microphone 136, or any audio source, whether real time or stored, digital or analog, is encoded by the sound card and supplied to the microprocessor, which drives the data onto the network cable pair 144. Then, the inductive receiver 146 can be employed along the network to pick up the audio information driven onto the network cable. The information may comprise real-time speech, providing a one-way intercom for communication from one network maintenance person to another, simple tones, modulated tone, etc. Digital audio files (such as .WAV files, for example) can be applied to the network cable. Different data may be driven onto different pairs, to assist in determining which pair is which, for example, by contacting the specific pair with the inductive receiver. The use of an audio signal driven onto the network cable can assist a network maintenance person in locating which cable of many, for example, in a cable tray or network closet is the particular cable being tested at a given time, by providing audio identification over that cable, detectable with the inductive receiver. The signal applied to the cable can be pulse width modulated, for example. The sound card 134 can be a USB or PCMCIA card, for example, or any source of audio information that may be supplied by the microprocessor to the I/O port for driving the data onto the network cable. Normally, the audio signals are not intended to be applied to receive pairs on active network cables, to avoid interfering with network operations.

Figure 21:
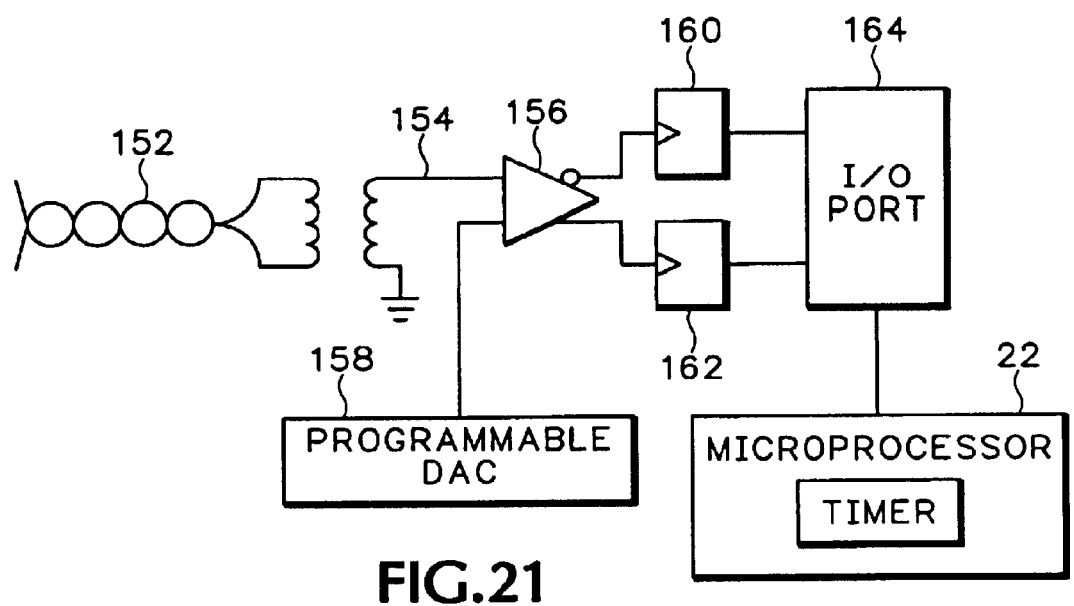
FIG. 21 is a block diagram of a link pulse detection system according to the present invention.

Referring now to FIG. 21, which is a schematic of circuitry employed in detecting and classifying Ethernet link pulse, there are three common types of Ethernet systems which might typically be encountered by a network testing instrument, 10M (NLP normal link pulse), which is characterized by 100 ns link pulses spaced 6–150 ms apart, 10/100 FLP (fast link pulse), which will have on 16 ms spacings, up to thirty-three pulses of 100 ns, each approximately 64 microseconds apart, and 100 TX, which employs MLT-3, multi-level encoding, a square wave like signal that rises for a period, then returns to a base line for a period, falls for a period and then returns to the base line for a period, cycling again to rise. There is 10 ns between possible edges of the waveform. It is desirable for a test instrument to determine what kind of system it is connected, without requiring user intervention (the user may not know the type). Therefore, referring to FIG. 21, a schematic diagram of the circuitry employed according to the invention to detect and classify link pulse, signals are received over a twisted pair cable 152 into the primary of transformer 154. One end of the secondary of the transformer is grounded, the other end of the secondary being supplied as a first input to a comparator 156. A second input to the comparator is supplied from a programmable digital to analog converter. The comparator provides two outputs, which are supplied to falling edge detection latch 160 and rising edge detection latch 162, which are sampled by microprocessor 22 via I/O port 164.

In operation the circuitry of FIG. 21 is employed to detect and classify link pulse. First, the noise level on the wire pair is measured, and the output of the digital to analog converter 158 is set to be two times the noise level. Then, rising edge to rising edge times are measured, collecting data for 50 ms in a histogram array having 10 microsecond buckets, plus one bucket of greater than 1 millisecond. If during the measurement, only one edge has been detected, then measurements are repeated with a 150 millisecond sample window. The above measurements are repeated with all possible permutations of receive signal pairs and polarities, until a signal is found. The microprocessor includes a timer, and measures the time between link signal edges, as detected by the latches 160 and 162.

Next, the results may be classified as follows: for 100 TX, the measurements substantially all fall in the first 2 buckets. For 10M NLP, the measurements fall only in the last bucket (the greater than 1 millisecond bucket). For 10/100 FLP, the results fall in the 60 microsecond, 120 microsecond, 180 microsecond and greater than 1 millisecond buckets.

The link pulse detection in accordance with the invention detects and classifies at very low signal levels. It also automatically adapts for very slow link pulse. Further, it determines the receive pair and the polarity thereof.

In a particular implementation, a measurement might fall on a bucket boundary, so pairs of buckets may be suitably summed to catch any entries that overlap a bucket boundary. The threshold of twice the noise level may also be adjusted to be closer to the noise level, if desired.

Accordingly, the detection of link pulse is statistically accurate and is tolerant of noise.

Therefore, in accordance with the invention, an improved network test instrument employing PN sequences for testing is able to test active networks without interfering with normal operation of the network. The instrument further allows characterization of very short cables and impedance measurement. Also, the device is adapted for applying audio signals over the network cables, for use in trouble shooting network operations.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A network test instrument comprising:

a PN sequence generator for generating at least a first and a second PN sequence and applying said at least first and second PN sequences to a network cable, wherein said first and second PN sequences are different from one another; and a receiver for receiving network response to the at least first and second PN sequence application, and characterizing network cabling in response thereto.

2. The network test instrument of claim 1, wherein said receiver characterizes network cabling response by combining response of the network cable to the at least first and at least second PN sequence.

3. The network test instrument of claim 2, wherein said combining comprises averaging.

4. The network test instrument of claim 2, wherein said combining comprises determining a product of the response to the at least first and at least second PN sequence.

5. The network test instrument of claim 1, wherein the network comprises an Ethernet.

6. A method of testing a network comprising:

generating a first PN sequence and applying said first PN sequence to a network interface;

determining network response to the applying of said first PN sequence;

generating at least a second PN sequence different from said first PN sequence and applying said second PN sequence to the network interface; and determining network response to the applying of said second PN sequence.

7. The method according to claim 6, wherein said step of applying said first PN sequence to a network interface comprises applying a highly attenuated signal to the network interface.

8. The method according to claim 7, wherein said highly attenuated signal is attenuated to below a noise threshold of network receivers.

9. The method according to claim 6, wherein said network comprises an Ethernet.

* * * * *